United States Patent
Kozu et al.

(10) Patent No.: US 11,351,901 B1
(45) Date of Patent: Jun. 7, 2022

(54) CONCEALED VEHICLE GRAB HANDLE ASSEMBLY

(71) Applicant: Toyota Motor North America, Inc., Plano, TX (US)

(72) Inventors: Yuho Kozu, McKinney, TX (US); Imad Zahid, Carrollton, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/148,429

(22) Filed: Jan. 13, 2021

(51) Int. Cl.
  *B60N 3/02* (2006.01)

(52) U.S. Cl.
  CPC ................... *B60N 3/023* (2013.01)

(58) Field of Classification Search
  CPC ....................................................... B60N 3/023
  USPC ....................................................... 296/1.02
  See application file for complete search history.

(56) References Cited

U.S. PATENT DOCUMENTS

| | | | | |
|---|---|---|---|---|
| 6,431,643 | B2* | 8/2002 | Grey | B60N 2/002 |
| | | | | 105/354 |
| 7,594,684 | B2* | 9/2009 | Hidaka | B60N 3/023 |
| | | | | 16/110.1 |
| 7,744,141 | B2 | 6/2010 | Saionji et al. | |
| 7,775,573 | B2* | 8/2010 | Lipke | B60N 3/026 |
| | | | | 296/1.02 |
| 7,905,530 | B2* | 3/2011 | Browne | B60N 3/023 |
| | | | | 296/1.02 |
| 8,052,188 | B2* | 11/2011 | Chernoff | B60N 3/023 |
| | | | | 296/1.02 |
| 8,443,553 | B1* | 5/2013 | Polewarczyk | E05B 85/103 |
| | | | | 49/503 |
| 8,465,065 | B2* | 6/2013 | Browne | B60N 3/023 |
| | | | | 292/336.3 |
| 8,636,313 | B2 | 1/2014 | Huelke et al. | |
| 8,684,435 | B1* | 4/2014 | Lee | E05B 81/34 |
| | | | | 296/1.02 |
| 8,690,204 | B2* | 4/2014 | Lang | E05B 81/77 |
| | | | | 292/336.3 |
| 8,919,047 | B2* | 12/2014 | Johnsrud | E05B 85/107 |
| | | | | 49/503 |
| 9,079,542 | B1* | 7/2015 | Ross | B60R 7/10 |
| 9,771,010 | B2* | 9/2017 | Lee | B60J 5/0426 |
| 9,821,696 | B1* | 11/2017 | Logan, Jr. | B60N 3/023 |

(Continued)

FOREIGN PATENT DOCUMENTS

| | | |
|---|---|---|
| CN | 206938550 U | 1/2018 |
| CN | 110254318 A | 9/2019 |

(Continued)

*Primary Examiner* — Jason S Morrow
(74) *Attorney, Agent, or Firm* — Snell & Wilmer LLP (57) ABSTRACT

Vehicle grab handle assemblies and methods of using the same. A vehicle grab handle assembly may have a grab handle. The grab handle may have a proximal end flush with an exterior surface of a headliner of the vehicle in a retracted position. The exterior surface may face away from a roof of the vehicle. Alternately, the proximal end may be between the exterior surface and the roof in the retracted position. The proximal end may extend out of the exterior surface and away from the roof in an extended position. The vehicle grab handle assembly may have a retraction-extension mechanism. The retraction-extension mechanism may be capable of traversing the grab handle between the retracted position and the extended position.

20 Claims, 8 Drawing Sheets

(56) References Cited

U.S. PATENT DOCUMENTS

| | | | | |
|---|---|---|---|---|
| 10,077,585 B2* | 9/2018 | Lee | ....................... | E05B 85/107 |
| 10,100,562 B2* | 10/2018 | Seo | ......................... | E05B 81/34 |
| 10,280,658 B2* | 5/2019 | Halliwell | .............. | E05B 85/107 |
| 2008/0217941 A1* | 9/2008 | Chernoff | ................ | B60N 3/023 |
| | | | | 296/1.02 |
| 2020/0114797 A1* | 4/2020 | Sakurai | ................. | B60N 2/002 |

FOREIGN PATENT DOCUMENTS

| | | | |
|---|---|---|---|
| CN | 110371006 A | 10/2019 | |
| EP | 1072466 B1 | 10/2003 | |

* cited by examiner

CONCEALED VEHICLE GRAB HANDLE ASSEMBLY

FIELD

The present disclosure is directed to concealed vehicle grab handle assemblies and methods of using the same.

DESCRIPTION OF THE RELATED ART

Users (e.g., drivers and/or passengers) of vehicles may need a grab handle in the vehicle cockpit for various reasons, including provided support for getting in and out of the vehicle, provided stability during the course of a ride, and attaching items (e.g., clothes, tie-down straps, etc.). Conventional grab handles may take up unwanted space in the cockpit, lead to the users accidentally bumping into them, and look visually unappealing despite generally being needed only momentarily before, during, or after a ride.

As such, there is a need for a concealed vehicle grab handle assembly.

SUMMARY

Vehicle grab handle assemblies and methods of using the same are disclosed herein. The grab handle assembly may have a grab handle housed between a roof and a headliner of a vehicle. The grab handle may be extended out from an opening on the headliner via a retraction-extension mechanism when needed. The grab handle may automatically retract into its housing once let go. Once the grab handle is retracted, the opening may be seamless with the headliner as the grab handle sits flush with the headliner or a cover covering the grab handle sits flush with the headliner.

In accordance with an embodiment of the present disclosure, there may be a vehicle grab handle assembly. The vehicle grab handle assembly may have a grab handle. The grab handle may have a proximal end. The proximal end may be flush with an exterior surface of a headliner of the vehicle. The exterior surface may face away from a roof of the vehicle. Alternately, the proximal end may be between the exterior surface and the roof in a retracted position. The proximal end may extend out of the exterior surface and away from the roof in an extended position. The retraction-extension mechanism may be capable of traversing the grab handle between the retracted position and the extended position. The grab handle may have a first lengthwise side and a second lengthwise side opposing the first lengthwise side. The first and second lengthwise sides may be parallel to a door frame of the vehicle in the extended position.

The retraction-extension mechanism may automatically traverse the grab handle from the extended position to the retracted position when the grab handle is let go. The vehicle grab handle assembly may further have a weight sensor. The weight sensor may be configured to detect a presence of a person sitting on a seat of the vehicle that the grab handle is designated for. The vehicle grab handle assembly may further have an electronic control unit (ECU). The ECU may be coupled to the weight sensor and the retraction-extension mechanism. The ECU may be configured to traverse the grab handle from the retracted position to the extracted position when the person sits on the seat and traverse the grab handle from the extracted position to the retracted position when the person leaves the seat. The ECU may be further configured to actuate the retraction-extension mechanism to traverse the grab handle between the retracted position and the extended position based on predetermined user instructions.

The retraction-extension mechanism may have a lock mechanism that stops the extension of the grab handle when the grab handle is pulled with a force greater than a predetermined force threshold to prevent unwanted extension of the grab handle. The grab handle may be rotated about the retraction-extension mechanism and away from the roof such that the proximal end extends out of the exterior surface in a transition position and extended down and away from the roof in the extended position. The proximal end may be between the exterior surface and the roof in the retracted position. The vehicle grab handle assembly may further have a cover having an outer surface facing away from the roof. The outer surface may be flush with the exterior surface in the retracted position.

In accordance with an embodiment of the present disclosure, there may be a vehicle grab handle assembly. The vehicle grab handle assembly may have a grab handle. The grab handle may have a proximal end. The proximal end may be flush with an exterior surface of a headliner of the vehicle in a retracted position. The exterior surface may face away from a roof of the vehicle. The grab handle may be rotated away from the roof such that the proximal end extends out of the exterior surface in a transition position. The grab handle may be extended down and away from the roof in an extended position. The vehicle grab handle assembly may have a retraction-extension mechanism. The retraction-extension mechanism may have a mounting portion fixed between the headliner and the roof. The retraction-extension mechanism may further have an extending portion located between the headliner and the roof in the retracted position and extending out of the exterior surface in the extended position. The retraction-extension mechanism may be capable of traversing the grab handle between the retracted position, the transition position, and the extended position. The grab handle may have a first lengthwise side and a second lengthwise side opposing the first lengthwise side. The first and second lengthwise sides may be parallel to a door frame of the vehicle in the extended position.

The retraction-extension mechanism may automatically traverse the grab handle from the extended position to the retracted position when the grab handle is let go. The vehicle grab handle assembly may further have a weight sensor. The weight sensor may be configured to detect a presence of a person sitting on a seat of the vehicle that the grab handle is designated for. The vehicle grab handle assembly may further have an ECU. The ECU may be coupled to the weight sensor and the retraction-extension mechanism. The ECU may be configured to traverse the grab handle from the retracted position to the transition position and from the transition position to the extracted position when the person sits on the seat. The ECU may be further configured to traverse the grab handle from the extracted position to the transition position and from the transition position to the retracted position when the person leaves the seat. The ECU may be further configured to actuate the retraction-extension mechanism to traverse the grab handle between the retracted position and the extended position based on predetermined user instructions. The retraction-extension mechanism may have a lock mechanism. The lock mechanism may stop the extension of the grab handle from the transition position to the extended position when the grab handle is pulled with a force greater than a predetermined force threshold to prevent unwanted extension of the grab handle.

In accordance with an embodiment of the present disclosure, there may be a method of using a vehicle grab handle assembly. The method may include pulling a grab handle from a housing between a headliner and a roof of the vehicle such that the grab handle extends out of an opening of the housing to grip the handle with one or more fingers. The opening may interrupt an exterior surface of the headliner. The exterior surface may face away from a roof of the vehicle. The grab handle may be extendably attached to the housing via a retraction-extension mechanism. The pulling step may include rotating the grab handle about the retraction-extension mechanism and away from the roof. The pulling step may further include extending the grab handle down and away from the roof. The method may further include letting go of the grab handle to allow the grab handle to retract into the housing such that a proximal end of the grab handle is within the opening or flush with the opening. The method may further include pushing the grab handle into the housing to undo a latch to allow the grab handle to drop down from the housing in a direction away from the roof. The grab handle may have a first lengthwise side and a second lengthwise side opposing the first lengthwise side. The first and second lengthwise sides may be parallel to a door frame of the vehicle when the grab handle is extended down. The method may further include programming an ECU coupled to the retraction-extension mechanism to facilitate the pulling step and retract the grab handle into the housing.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The assemblies and methods described herein enable users (e.g., drivers and/or passengers (interchangeable when referring to autonomous or semi-autonomous vehicles)) to have a convenient and space saving grab handle seamlessly integrated into a headliner of a vehicle. The users may need the grab handle for various reasons, including provided support for getting in and out of the vehicle, provided stability during the course of a ride, and attaching items (e.g., clothes, tie-down straps, etc.). The assemblies described herein advantageously provide a built-in, retractable, and compact grab handle that is stored within and/or above the headliner inside the vehicle cockpit. The grab handle may advantageously automatically retract when the users lets go of their grip. The grab handle may be advantageously actuated automatically based on the users programming an electronic control unit (ECU) of the vehicle configured to control the grab handle assembly extension and retraction based on desired utility.

In an exemplary embodiment, the grab handle assembly may have a grab handle housed between a roof and a headliner of a vehicle. The grab handle may be extended out from an opening interrupting the headliner via a retraction-extension mechanism for grabbing. The grab handle may automatically retract into its housing once let go by the user. Once the grab handle is retracted, the opening may be seamless with the headliner, with the grab handle sitting flush with the headliner or a cover covering the grab handle sitting flush with the headliner. An exposed proximal end of the grab handle or the cover may be the same material as the headliner to conceal the grab handle assembly.

Figure 1:
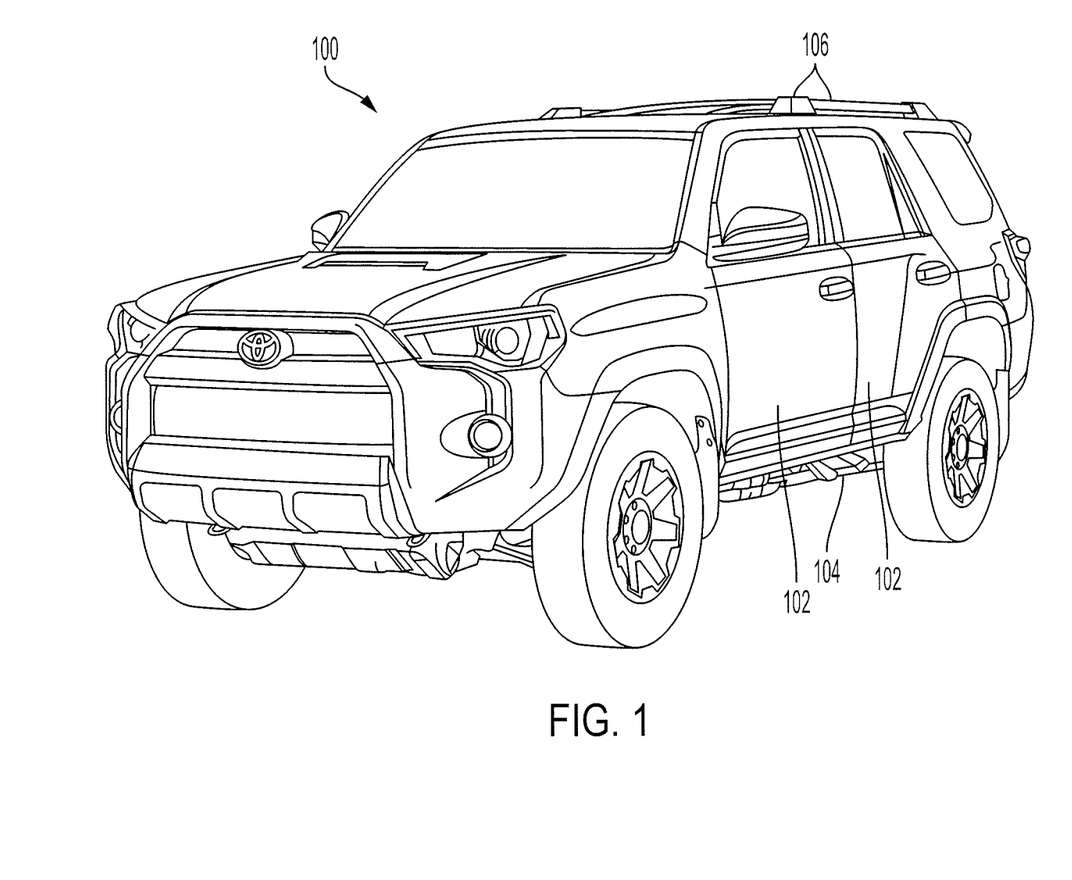
FIG. 1 illustrates a perspective view of a vehicle according to an aspect of the present disclosure.

FIG. 1 illustrates a perspective view of a vehicle 100 according to an aspect of the present disclosure. The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a car, an SUV, a truck, a bus, a van or other motor or battery driven vehicle. For example, the vehicle 100 may be an electric vehicle, a hybrid vehicle, a plug-in hybrid vehicle, a fuel cell vehicle, or any other type of vehicle that includes a motor/generator. FIG. 1 depicts an SUV by example. The vehicle 100 may be an autonomous or semi-autonomous vehicle having self-driving capabilities. The vehicle 100 may have doors 102 to enter and exit out of the vehicle 100. The vehicle 100 may have one or more side steps 104 to assist with entering and exiting out of the vehicle 100 and accessing a roof rack 106.

Figure 2:
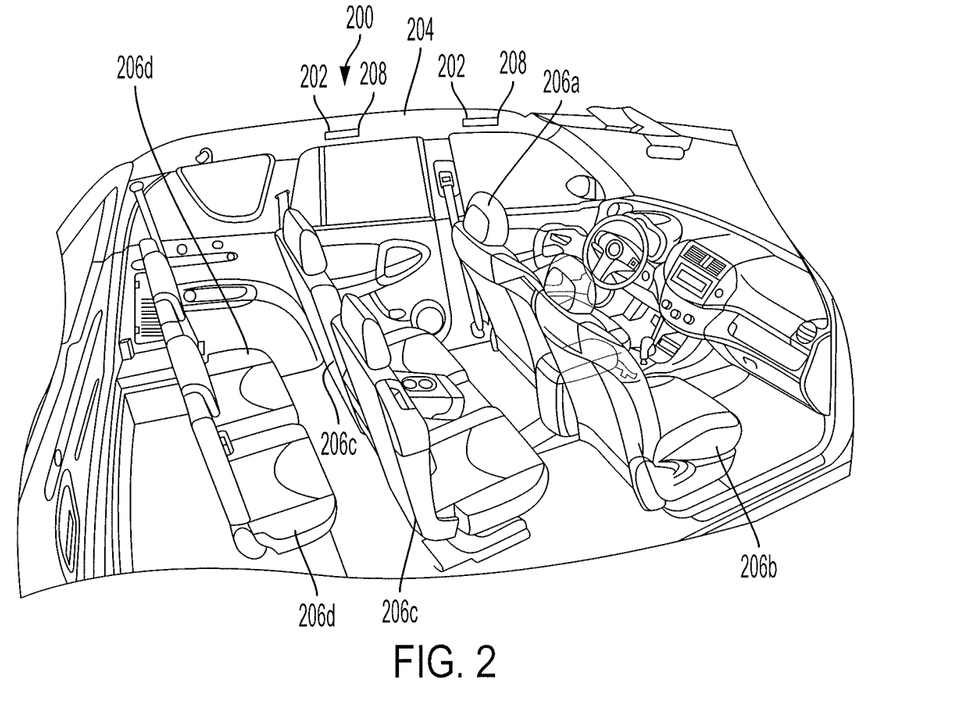
FIG. 2 illustrates an interior of the vehicle shown in FIG. 1 having grab handle assemblies according to an aspect of the present disclosure.

FIG. 2 illustrates an interior 200 of the vehicle 100 having grab handle assemblies 202 according to an aspect of the present disclosure. The grab handle assemblies 202 may be integrated with a headliner 204 of the interior 200. The headliner 204 may be made of fabric, felt, foam, plastic, metal, wood, and any other material conventionally used in headliner manufacturing. There may be a grab handle assembly 202 paired with each seat 206. In some embodiments, only a driver seat 206a and/or a front passenger seat 206b or back passenger seats 206c and/or extra row of passenger seats 206d may have access to a grab handle assembly 202. FIG. 2 shows the driver seat 206a and one of the back passenger seats 206c having access to a grab handle assembly 202. The grab handle assemblies 202 may be concealed in the headliner 204 in a retracted position. An exterior 208 of each grab handle assembly 202 exposed to the interior 200 may be flush with the headliner 204 in the retracted position. The exterior 208 and the headliner 204 may be made from the same material or materials. The exterior 208 may be fabric, felt, foam, plastic, metal, wood, and the like. The exterior 208 and the headliner 204 may have the same texture and/or color. The exterior 208 may have a rectangular shape as shown in FIG. 2. In some embodiments, the exterior 208 may have the shape of any polygon or an arcuate shape. The exterior 208 may have one or more protrusions, recesses, cavities, holes, and/or any other structural feature that may help the user grip the exterior 208. The exterior 208 may have one or more light sources (e.g., LED, light bulb, etc.). The exterior 208 may feature a paint, a wrap, and the like that glows in the dark. The light sources and the application of a material that glows in the dark may help the user locate the grab handle assembly 202 in the dark.

Figure 3A:
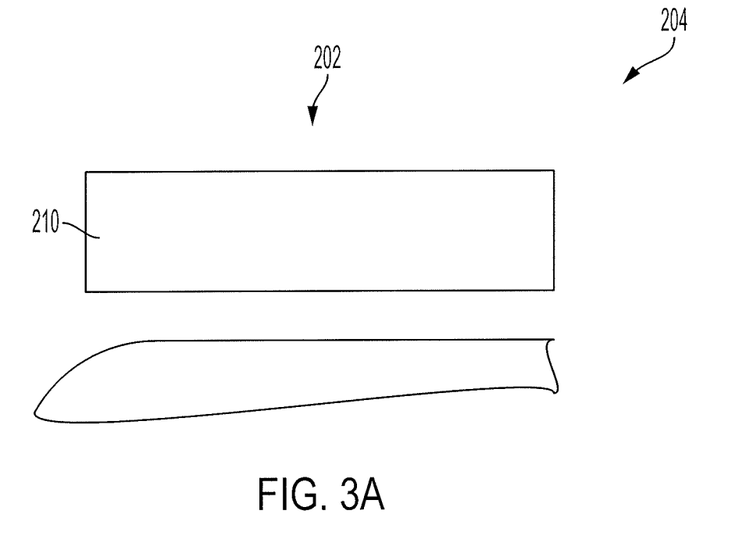
FIG. 3A illustrates a close-up view of one of the grab handle assemblies shown in FIG. 2 in a retracted position according to an aspect of the present disclosure.

FIG. 3A illustrates a close-up view of the grab handle assembly 202 in a retracted position according to an aspect of the present disclosure. The exterior 208 (see FIG. 2) may be a proximal end 210 of a grab handle 212 (see FIG. 4) of the grab handle assembly 202. The proximal end 210 may be flush with the headliner 204.

Figure 3B:
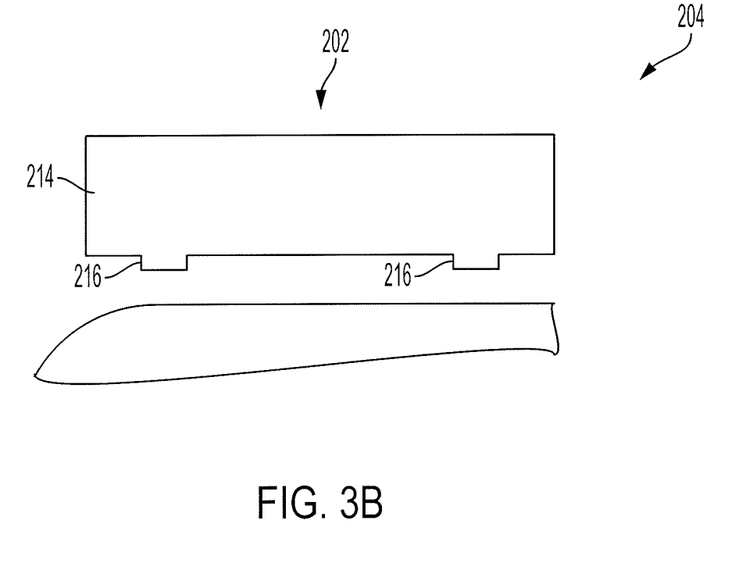
FIG. 3B illustrates a close-up view of one of the grab handle assemblies shown in FIG. 2 in the retracted position having a cover according to an aspect of the present disclosure.

FIG. 3B illustrates a close-up view of the grab handle assembly 202 in the retracted position having a cover 214 according to an aspect of the present disclosure. The cover 214 may be the exterior 208 shown in FIG. 2. The cover 214 may be flush with the headliner 204. The proximal end 210 (see FIG. 3A) may be receded into the headliner 204. This may allow the cover 214 to close and sit flush with the headliner 204 in the retracted position. The cover 214 may have hinges 216 pivotably attached to the headliner 204 to open and close when traversing between the retracted position and an extended position. The cover 214 may open and close in any other conventional fashion (e.g., sliding, disengaging latch, rotating out, collapsing). Once the cover 214 is in the open position, a clear and obstacle-free path for the grab handle 212 to extend out of the headliner 204 is established.

Figure 4:
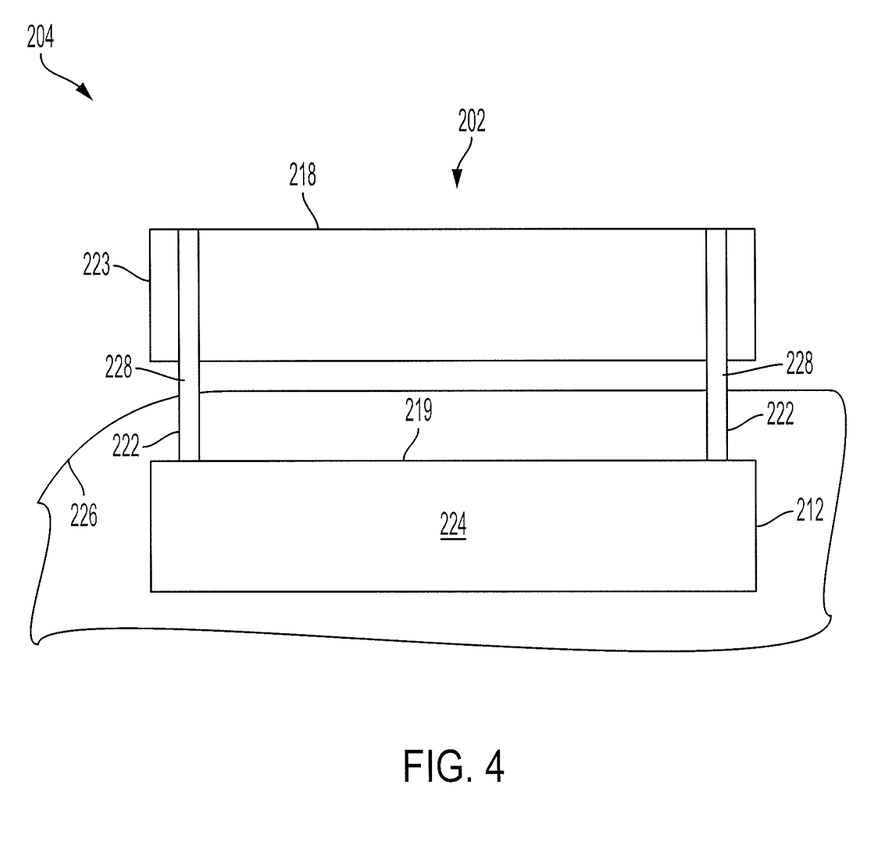
FIG. 4 illustrates the grab handle assembly shown in FIG. 3A in an extended position according to an aspect of the present disclosure.

FIG. 4 illustrates the grab handle assembly 202 in an extended position according to an aspect of the present disclosure. The grab handle 212 may extend out of an opening 218 interrupting the headliner 204. The opening 218 may be shaped and sized to complement the exterior 208 (see FIG. 2) of the grab handle assembly 202. The exterior 208 may form a tight fit with the opening 218. The tight fit may minimize the visibility of the contour of the exterior 208 on the headliner 204. The grab handle 212 may have an inner surface 219 facing towards the opening 218. The inner surface 219 may be where a substantial portion of a finger or fingers of the user come into contact with the grab handle 212. The inner surface 219 may be made of a material that provides an improved grip, such as rubber and the like. The inner surface 219 may be a rough surface for improved grip. The inner surface 219 may have a surface shape that makes grabbing the grab handle 212 easier. For example, the inner surface 219 may have a shape that conforms with one or more fingers of the user. In another example, the inner surface 219 may have a curvature that allows the user's hand to grip the grab handle 212 comfortably.

The grab handle 212 may be attached to a retraction-extension mechanism 220 (see FIGS. 5A-6B). The attachment may be any conventional means of attachment (e.g., screws, press fit, adhesives, nails, etc.). The retraction-extension mechanism 220 may employ a range of conventional deployment and retraction mechanisms. For example, the retraction-extension mechanism 220 may have a ratchet mechanism, a pulley mechanism, a sliding rail-track mechanism, a cable mechanism, a hinge mechanism, and/or the like. The retraction-extension mechanism 220 may be actuated via a motor, a solenoid, and/or the like. The retraction-extension mechanism 220 may have a mounting portion 221 (see FIGS. 5A-6B) and an extending portion 222. The extending portion 222 may move in and out of the opening 218 to traverse the grab handle 212 between the retracted position and the extended position. There may be a plurality of extending portions 222. There may be an extending portion 222 directly adjacent to each widthwise edge 223 of the opening 218. The extending portions 222 may mirror each other. The grab handle 212 may have lengthwise sides 224. The lengthwise sides 224 may be parallel to a door frame 226 of the vehicle 100 in the extended position. The extending portion 222 may have lengthwise sides 228. The lengthwise sides 228 may be parallel to the door frame 226 in the extended position. The extending portion 222 may be rigid (see FIGS. 5A-5B) or flexible (see FIGS. 6A-6B).

The length of the grab handle 212 may be between half inch (½ in) to twelve inches (12 in). Preferably, the length of the grab handle 212 may be between three inches (3 in) to five inches (5 in). The width of the grab handle 212 may be between half inch (½ in) to three inches (3 in). Preferably, the width of the grab handle 212 may be between one inch (1 in) to two inches (2 in). The height of the grab handle 212 may be between half inch (½ in) to three inches (3 in). Preferably, the height of the grab handle 212 may be between one inch (1 in) to two inches (2 in).

Figure 5A:
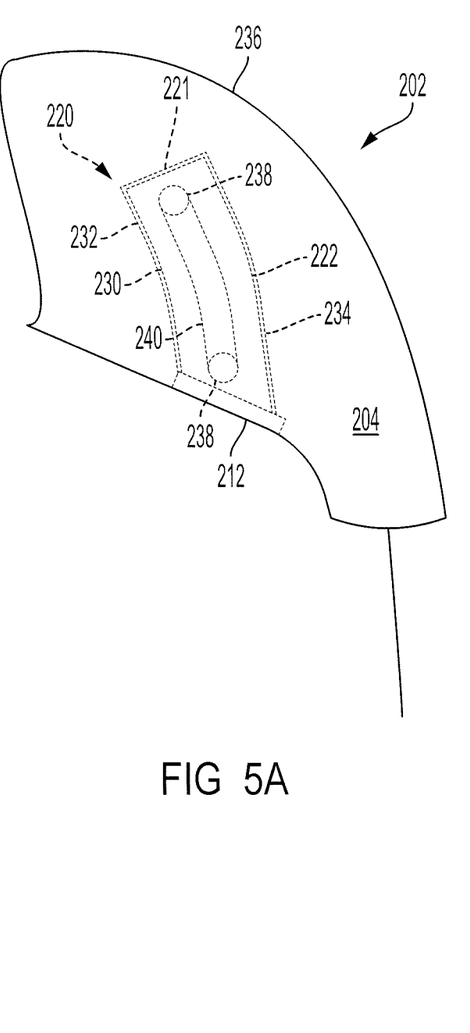
FIG. 5A illustrates a side view of the grab handle assembly shown in FIG. 3A having a rigid retraction-extension mechanism in the retracted position according to an aspect of the present disclosure.

FIG. 5A illustrates a side view of the grab handle assembly 202 having a rigid retraction-extension mechanism 220 in the retracted position according to an aspect of the present disclosure. The retraction-extension mechanism 220 may be a sliding mechanism. The sliding mechanism may have rigid rails 230 and tracks 232. The rails 230 and the tracks 232 may be housed in a housing 234. The housing 234 may extend from the opening 218 into the headliner 204. The housing 234 may be located between the headliner 204 and a roof 236 of the vehicle 100. The housing 234 may be located within one or more inner layers of the headliner 204, the one or more inner layers being stacked towards the roof 236. The housing 234 may be shaped and sized to fit the retraction-extension mechanism and the grab handle 212 in the retracted position. The housing 234 may complement the shape of the grab handle assembly 202.

As shown in FIG. 5A, the retraction-extension mechanism 220 may be curved. The curvature of the retraction-extension mechanism 220 may allow the grab handle assembly 202 to be stored in tight spaces. The tracks 232 may be fixed to the housing 234. The fixation may be achieved by any conventional means of attachment (e.g., screws, press fit, adhesives, nails, etc.). The rails 230 may be locked such that they cannot move with respect to the tracks 232 in the retracted position. For example, retractable pins 238 (e.g., spring actuated) may extend from the housing 234 or the tracks 232 to catch a slot 240 of the rails 230 when the grab handle 212 is brought to a retracted position. The rails 230 may be locked with any other conventional locking means, such as latches, clips, and the like.

Figure 5B:
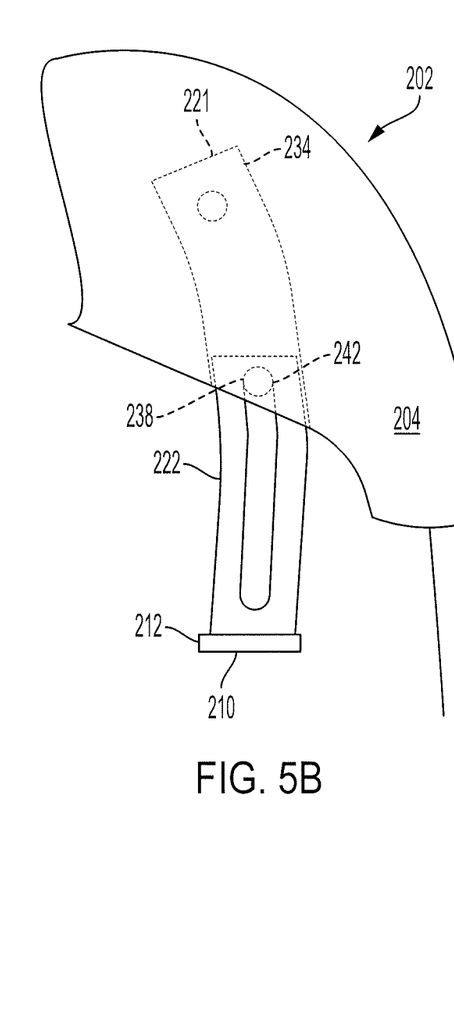
FIG. 5B illustrates a side view of the grab handle assembly shown in FIG. 5A in the extended position according to an aspect of the present disclosure.

FIG. 5B illustrates a side view of the grab handle assembly 202 in the extended position according to an aspect of the present disclosure. The sliding of the rails 230 on the tracks 232 may be facilitated by wheels, ball bearings, magnets, dampers, and/or the like. The sliding may be stopped when a desired extension of the grab handle 212 is achieved. The sliding may be stopped by conventional means such as track end stops, bumpers, and pins. For example, the sliding may be stopped by the retractable pin 238 catching the slot 240 from an upper end 242.

Figure 8:
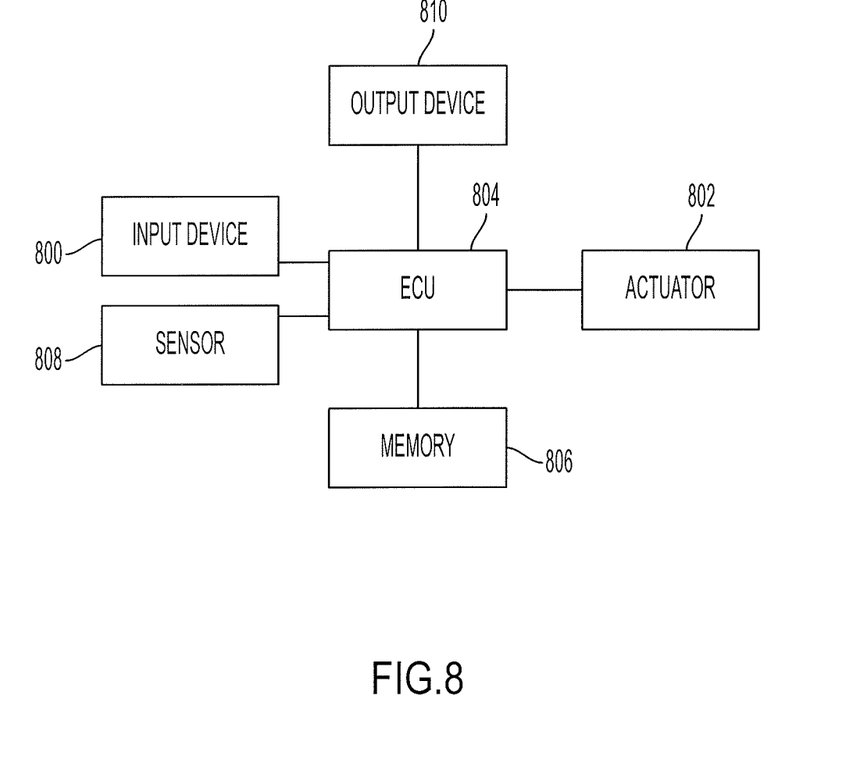
FIG. 8 is a block diagram illustrating various components of the vehicle shown in FIG. 1 according to an aspect of the present disclosure.

The sliding may be initiated via an input device 800 (e.g., button, knob, slider, touchscreen; see FIG. 8). The input device 800 may communicate with an actuator 802 (e.g., motor, solenoid; see FIG. 8) to automatically slide the rails 230 along the tracks 232. The input device 800 may receive input other than extending and retracting. For example, the input device 800 may receive instructions by the user regarding when to extend and retract, extension distance, events that trigger extension and retraction (e.g., sitting and getting up, opening and closing a door 102, stepping on a side step 104). The input device 800 may transmit these instructions to the ECU 804 (see FIG. 8) which may then control the actuator 802.

The grab handle 212 may automatically retract into the housing 234 via a spring mechanism, a motor, a solenoid, and/or the like. In some embodiments, the automatic retraction may be initiated by letting go of the grip of the grab handle 212. In some embodiments, the automatic retraction may be initiated by pulling on the grab handle 212 before letting go of the grip to trigger the spring mechanism. In some embodiments, the automatic retraction may be initiated by the input device 800 triggering the actuator 802, for example, a touch sensor integrated to the proximal end 210.

Figure 6A:
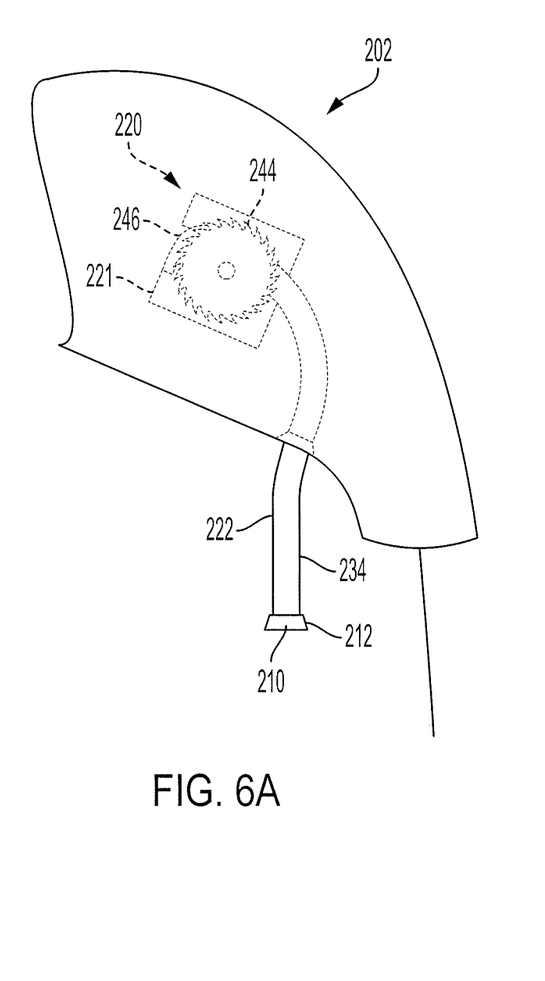
FIG. 6A illustrates a side view of the grab handle assembly shown in FIG. 3A having a flexible retraction-extension mechanism in the extended position according to an aspect of the present disclosure.

FIG. 6A illustrates a side view of the grab handle assembly 202 having a flexible retraction-extension mechanism 220 in the extended position according to an aspect of the present disclosure. Only one side of the retraction-extension mechanism 220 is shown in FIG. 6A for clarity. The retraction-extension mechanism 220 may be a combination of a cable and a ratchet mechanism as shown in FIG. 6A. The mounting portion 221 may be the ratchet mechanism. The extending portion 222 may be the cable mechanism. The cable may be wound around a spool. The spool may rotate with a set of teeth 244 of the ratchet mechanism. A pawl 246 of the ratchet mechanism may allow the teeth 244 to rotate in one direction only, thus preventing movement in an unwanted direction. When extending the grab handle 212, the ratchet mechanism may prevent the grab handle 212 from retracting, and vice versa. The retraction-extension mechanism 220 may utilize additional locking measures such as latches, clips, and the like. A portion or all of the cable may have a cover that can bend or having segments that allow the cable to flex and turn corners.

The grab handle 212 may automatically retract into the housing 234 via a spring mechanism, a motor, a solenoid, and/or the like by rewinding the spool. In some embodiments, the automatic retraction may be initiated by letting go of the grip of the grab handle 212. In some embodiments, the automatic retraction may be initiated by pulling on the grab handle 212 before letting go of the grip to trigger the spring mechanism. In some embodiments, the automatic retraction may be initiated by the input device 800 (see FIG. 8) triggering the actuator 802 (see FIG. 8), for example, a touch sensor integrated to the proximal end 210.

Figure 6B:
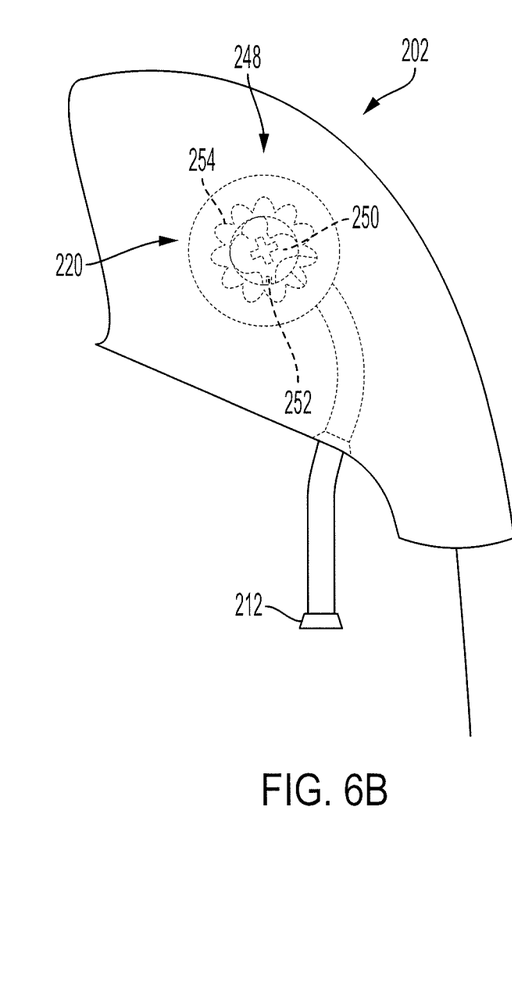
FIG. 6B illustrates a side view of the grab handle assembly shown in FIG. 6A having a lock mechanism in the in the extended position according to an aspect of the present disclosure.

FIG. 6B illustrates a side view of the grab handle assembly 202 having a lock mechanism 248 in the extended position according to an aspect of the present disclosure. The lock mechanism 248 may stop the extension of the grab handle 212 when the grab handle 212 is pulled with a force greater than a predetermined force threshold to prevent unwanted extension of the grab handle 212. The predetermined force threshold may be between a hundred pounds (100 lbs) and seven hundred pounds (700 lbs). The lock mechanism 248 may be attached to the retraction-extension mechanism 220 shown in FIG. 6A. An outer disk 250 may be loosely attached to the spool. The outer disk 250 may rotate with the spool when the grab handle 212 is being extended. However, if the predetermined force threshold is exceeded, the spool may turn at a speed high enough that the outer disk 250 cannot catch up due to the loose attachment. When the outer disk 250 rotates slower than the spool, a space 252 on the outer disk 250 may get caught by outer teeth 254 fixed to the vehicle 100 and stop the extension of the grab handle 212. Other lock mechanisms are also contemplated, including a torsion bar.

Figure 7A:
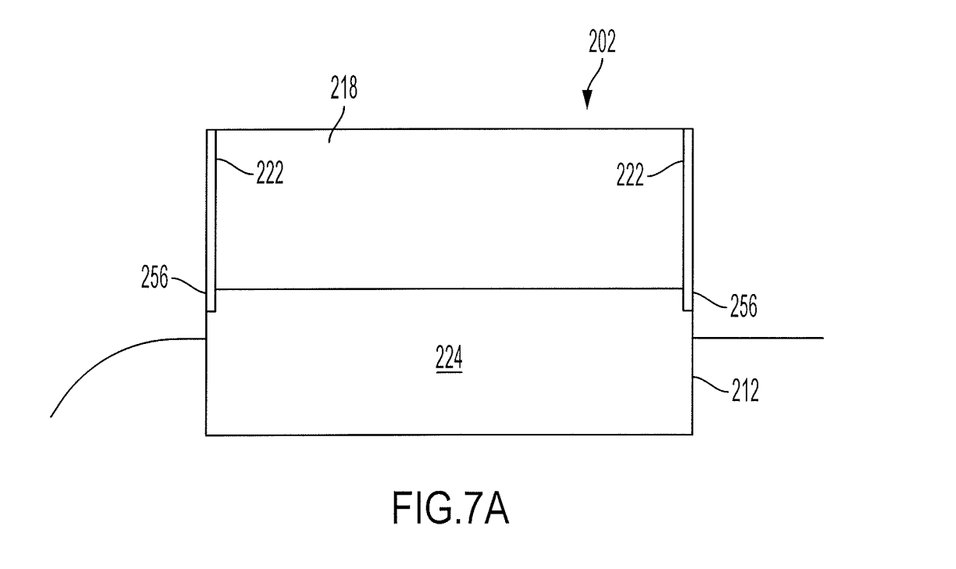
FIG. 7A illustrates the grab handle assembly shown in FIG. 3A in a transition position according to an aspect of the present disclosure.

FIG. 7A illustrates the grab handle assembly 202 in a transition position according to an aspect of the present disclosure. In such embodiments, the transition position may be an intermediary position between the retracted position and the extended position. In the transition position, the grab handle 212 may be rotated out of the opening 218 of the housing 234. The grab handle 212 may be pivotally attached to the extending portions 222 of the retraction-extension mechanism 220. The attachment may be via hinges 256. In order to rotate the grab handle 212, the user may push the grab handle 212 into the opening 218 to activate a spring mechanism to rotate the grab handle 212 out of the opening 218. Alternately, the user may grip the grab handle 212 by any structural feature (e.g., protrusion, cavity, hole, etc.) on the proximal end 210 that enables a grip. Alternately, an automatic rotation may be initiated by the input device 800 (see FIG. 8) triggering the actuator 802 (see FIG. 8), for example, a touch sensor integrated to the proximal end 210. The grab handle 212 may be rotated until the lengthwise sides 224 of the grab handle 212 are parallel to the door frame 226 of the vehicle 100. The rotation of the grab handle 212 may be stopped by conventional means such as bumpers, pins, and stopping the actuator 802 (e.g., a motor).

Figure 7B:
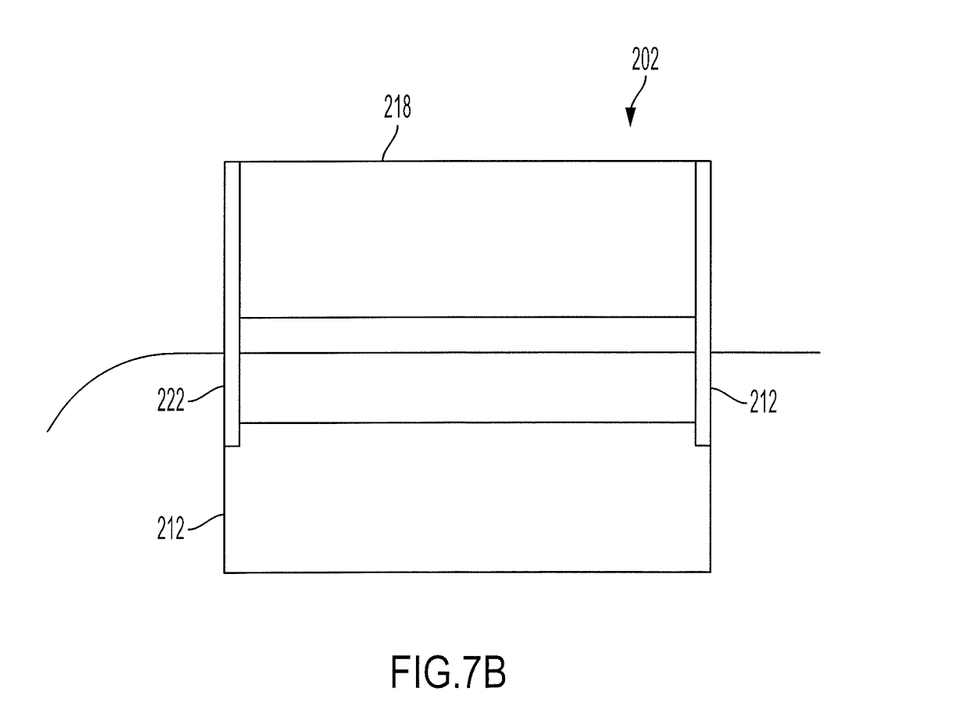
FIG. 7B illustrates the grab handle assembly shown in FIG. 7A in the extended position according to an aspect of the present disclosure.

FIG. 7B illustrates the grab handle assembly 202 in the extended position according to an aspect of the present disclosure. The extending portions 222 may extend out of the opening 218 after the grab handle 212 is rotated. The extension may be actuated via a motor, a solenoid, and/or the like. The extending portions 222 may move in and out of the opening 218 to traverse the grab handle 212 between the transition position and the extended position. The extension may be initiated via an input device 800 (e.g., button, knob, slider, touchscreen, motion sensor; see FIG. 8). For example, a motion sensor may be positioned adjacent to the grab handle 212 and as a user's hand gets close to the motion sensor, the grab handle 212 automatically moves to the extended position. The motion sensor may be adjusted to detect a hand and will extend the grab handle 212 when the hand is close to and/or moving towards the motion sensor. This may prevent inadvertent extension of the grab handle 212.

The input device 800 may communicate with an actuator 802 (e.g., motor, solenoid; see FIG. 8) to automatically extend the extending portions 222. The grab handle 212 may automatically retract into the housing 234 and rotating up to cover the opening 218 entirely via a spring mechanism, a motor, a solenoid, and/or the like. In some embodiments, the automatic retraction may be initiated by letting go of the grip of the grab handle 212. In some embodiments, the automatic retraction may be initiated by pulling on the grab handle 212 before letting go of the grip to trigger the spring mechanism. In some embodiments, the automatic retraction may be initiated by the input device 800 triggering the actuator 802, for example, a touch sensor integrated to the proximal end 210. The means of rotation and extension shown in FIGS. 7A-7B are exemplary only, and there may be other suitable ways to rotate and extend the grab handle 212 appreciated by one of ordinary skill in the art.

FIG. 8 is a block diagram illustrating various components of the vehicle 100 (see FIG. 1) according to an aspect of the present disclosure. In particular, the vehicle 100 may include an input device 800, an actuator 802, an ECU 804, a memory 806, a sensor 808, and an output device 810.

The input device 800 may receive visual, auditory, and/or touch input. For example, the input device 800 may be a camera, a microphone, a touchscreen, a button, or a remote. The user may input commands and information into the input device 800 to control the ECU 804. For example, the input device 800 may receive biometric information, the user's voice, and/or the user's touch input with one or more fingers.

The actuator 802 may automatically traverse the grab handle 212 between the extended position and the retracted position. The actuator 802 may be a motor (e.g., an AC motor, a DC motor, a micromotor), a solenoid (e.g., a rotary solenoid), or any other suitable electromechanical actuator appreciated by one of ordinary skill in the art.

The ECU 804 may be coupled to each of the components of the vehicle 100 and may include one or more processors or controllers, which may be specifically designed for automotive systems. The functions of the ECU 804 may be implemented in a single ECU or in multiple ECUs. The ECU 804 may receive data from components of the vehicle 100, may make determinations based on the received data, and may control the operation of components based on the determinations. In some embodiments, the vehicle 100 may be fully autonomous or semi-autonomous. In that regard, the ECU 804 may control various aspects of the vehicle 100 (such as steering, braking, accelerating, or the like) to maneuver the vehicle 100 from a starting location to a destination location.

The memory 806 may include any non-transitory memory known in the art. In that regard, the memory 806 may store machine-readable instructions usable by the ECU 804 and may store other data as requested by the ECU 804 or programmed by a vehicle manufacturer or operator.

The sensor 808 may be a weight sensor, a motion sensor, or any other sensor that is capable of detecting that a driver and/or a passenger has opened and/or closed a door 102 of the vehicle 100, sat down and/or got up from a seat 206, stepped on and/or stepped off from a side step 104, entered and/or left the vehicle 100, started and/or shut off an engine of the vehicle 100, unlocked and/or locked the vehicle 100, and/or the like. There may be a plurality of sensors 808 configured to detect the same and/or different action. The sensor 808 may be coupled to the ECU 804 and transmit data to the ECU 804. The data may then be stored in the memory 806. The ECU 804 may actuate the actuator 802 based on the data. For example, the ECU 804 may control the actuator 802 to extend the grab handle 212 when the passenger or the driver sits down and retract the grab handle 212 when the passenger or the driver stands up, thus preventing the passenger or the driver from hitting his/her head on the grab handle assembly 202. In another example, the ECU 804 may control the actuator 802 to extend the grab handle 212 when the passenger or the driver steps on the side step 104 and retract the grab handle 212 when the passenger or the driver is no longer stepping on the side step 104. In another example, the ECU 804 may control the actuator 802 to retract the grab handle 212 when the engine of the vehicle 100 is shut off or when the vehicle 100 is locked. The user may program the ECU 804 via the input device 800 and select the triggering event that extends and retracts the grab handle 212. The user may further program the ECU 804 via the input device 800 to customize when to extend and retract the grab handle 212. The ECU 804 may have a timer via which the ECU 804 can actuate the actuator 802 after the timer counts to a predetermined time. For example, the user may configure the ECU 804 to extend the grab handle 212 two seconds (2 secs) after the user is seated.

The output device 810 may present the user's input to the user for the user to affirm. The user may see or hear the settings previously inputted to the ECU 804. The output device 810 may visually or auditorily indicate that the grab handle 212 is being extended or retracted. The output device 810 may be a display. For example, the display may be on the dashboard or an infotainment unit of the vehicle 100. In some embodiments, the output device 810 may be a sound system. For example, the presentation may be in the form of a voice assistant reciting the current selection being made or a selection made previously through one or more speakers of the sound system.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle grab handle assembly, comprising:
a grab handle having a proximal end being between a headliner of the vehicle and a roof of the vehicle when in a retracted position, the proximal end extending out of an exterior surface of the headliner, the exterior surface facing away from the roof, and the proximal end extending away from the roof when in an extended position; and
a retraction-extension mechanism capable of traversing the grab handle between the retracted position and the extended position.

2. The vehicle grab handle assembly of claim 1 wherein the grab handle has a first lengthwise side and a second lengthwise side opposing the first lengthwise side, the first and second lengthwise sides being parallel to a door frame of the vehicle in the extended position.

3. The vehicle grab handle assembly of claim 1 wherein the retraction-extension mechanism automatically traverses the grab handle from the extended position to the retracted position when the grab handle is let go.

4. The vehicle grab handle assembly of claim 1 further comprising a weight sensor configured to detect a presence of a person sitting on a seat of the vehicle that the grab handle is designated for and an electronic control unit (ECU) coupled to the weight sensor and the retraction-extension mechanism, and configured to traverse the grab handle from the retracted position to the extracted position when the person sits on the seat and traverse the grab handle from the extracted position to the retracted position when the person leaves the seat.

5. The vehicle grab handle assembly of claim 1 further comprising an ECU coupled to the retraction-extension mechanism and configured to actuate the retraction-extension mechanism to traverse the grab handle between the retracted position and the extended position based on predetermined user instructions.

6. The vehicle grab handle assembly of claim 1 wherein the retraction-extension mechanism has a lock mechanism that stops extension of the grab handle when the grab handle is pulled with a force greater than a predetermined force threshold to prevent unwanted extension of the grab handle.

7. The vehicle grab handle assembly of claim 1 wherein the grab handle is rotated about the retraction-extension mechanism and away from the roof such that the proximal end extends out of the exterior surface in a transition position and extended down and away from the roof in the extended position.

8. The vehicle grab handle assembly of claim 1 further comprising a cover having an outer surface facing away from the roof, the outer surface being flush with the exterior surface when the grab handle is in the retracted position.

9. A vehicle grab handle assembly, comprising:
a grab handle having a proximal end, the proximal end being flush with an exterior surface of a headliner of the vehicle, the exterior surface facing away from a roof of the vehicle, in a retracted position, the grab handle being rotated away from the roof such that the proximal end extends out of the exterior surface in a transition position, and the grab handle being extended down and away from the roof in an extended position; and
a retraction-extension mechanism having a mounting portion fixed between the headliner and the roof and an extending portion located between the headliner and the roof in the retracted position and extending out of the exterior surface in the extended position, the retraction-extension mechanism capable of traversing the grab handle between the retracted position, the transition position, and the extended position.

10. The vehicle grab handle assembly of claim 9 wherein the grab handle has a first lengthwise side and a second lengthwise side opposing the first lengthwise side, the first and second lengthwise sides being parallel to a door frame of the vehicle in the extended position.

11. The vehicle grab handle assembly of claim 9 wherein the retraction-extension mechanism automatically traverses the grab handle from the extended position to the retracted position when the grab handle is let go.

12. The vehicle grab handle assembly of claim 9 further comprising a weight sensor configured to detect a presence of a person sitting on a seat of the vehicle that the grab handle is designated for and an electronic control unit (ECU) coupled to the weight sensor and the retraction-extension mechanism, and configured to traverse the grab handle from the retracted position to the transition position and from the transition position to the extracted position when the person sits on the seat, and traverse the grab handle from the extracted position to the transition position and from the transition position to the retracted position when the person leaves the seat.

13. The vehicle grab handle assembly of claim 9 further comprising an ECU coupled to the retraction-extension mechanism and configured to actuate the retraction-extension mechanism to traverse the grab handle between the retracted position and the extended position based on predetermined user instructions.

14. The vehicle grab handle assembly of claim 9 wherein the retraction-extension mechanism has a lock mechanism that stops extension of the grab handle from the transition position to the extended position when the grab handle is pulled with a force greater than a predetermined force threshold to prevent unwanted extension of the grab handle.

15. A method of using a vehicle grab handle assembly, the method comprising:
pulling a grab handle from a housing between a headliner and a roof of the vehicle such that the grab handle extends out of an opening of the housing, the opening interrupting an exterior surface of the headliner, the exterior surface facing away from a roof of the vehicle, to grip the handle with one or more fingers, the grab handle being extendably attached to the housing via a retraction-extension mechanism; and
letting go of the grab handle to allow the grab handle to retract into the housing such that a proximal end of the grab handle is within the opening or flush with the opening.

16. The method of claim 15 further comprising pushing the grab handle into the housing to undo a latch to allow the grab handle to drop down from the housing in a direction away from the roof.

17. The method of claim 15 wherein the pulling step comprises rotating the grab handle about the retraction-extension mechanism and away from the roof.

18. The method of claim 17 wherein the pulling step further comprises extending the grab handle down and away from the roof.

19. The method of claim 18 wherein the grab handle has a first lengthwise side and a second lengthwise side opposing the first lengthwise side, the first and second lengthwise sides being parallel to a door frame of the vehicle when the grab handle is extended down.

20. The method of claim 15 further comprising programming an ECU coupled to the retraction-extension mechanism to facilitate the pulling step and retract the grab handle into the housing.

\* \* \* \* \*